United States Patent
Dietsch

(10) Patent No.: US 11,173,880 B2
(45) Date of Patent: Nov. 16, 2021

(54) METHOD FOR OPERATING A VEHICLE WASHING SYSTEM, AND VEHICLE WASHING SYSTEM

(71) Applicant: WASHTEC HOLDING GMBH, Augsburg (DE)

(72) Inventor: Wolfgang Dietsch, Frankfurt (DE)

(73) Assignee: WASHTEC HOLDING GMBH, Augsburg (DE)

( * ) Notice: Subject to any disclaimer, the term of this patent is extended or adjusted under 35 U.S.C. 154(b) by 231 days.

(21) Appl. No.: 16/463,683

(22) PCT Filed: Nov. 17, 2017

(86) PCT No.: PCT/EP2017/079536
§ 371 (c)(1),
(2) Date: May 23, 2019

(87) PCT Pub. No.: WO2018/095808
PCT Pub. Date: May 31, 2018

(65) Prior Publication Data
US 2020/0324740 A1   Oct. 15, 2020

(30) Foreign Application Priority Data
Nov. 25, 2016 (DE) ..................... 10 2016 122 802.8

(51) Int. Cl.
*B60S 3/04* (2006.01)
*B60S 3/06* (2006.01)
(Continued)

(52) U.S. Cl.
CPC .............. *B60S 3/042* (2013.01); *B08B 1/002* (2013.01); *B08B 3/02* (2013.01); *B60S 3/04* (2013.01); *B60S 3/06* (2013.01)

(58) Field of Classification Search
CPC .... B60S 3/042; B60S 3/04; B60S 3/06; B08B 3/02; B08B 1/002
See application file for complete search history.

(56) References Cited

U.S. PATENT DOCUMENTS

| 4,916,771 A | 4/1990 | Weigele |
| 9,469,278 B2 | 10/2016 | Wimmer |
(Continued)

FOREIGN PATENT DOCUMENTS

| DE | 3811196 A1 | 10/1989 |
| DE | 20205050 U1 | 8/2002 |
(Continued)

OTHER PUBLICATIONS

International Search Report dated Jan. 11, 2018 for PCT/EP2017/079536 filed Nov. 17, 2017.
(Continued)

*Primary Examiner* — Alexander Markoff
(74) *Attorney, Agent, or Firm* — Paul D. Bianco; Gary S. Winer; Fleit Intellectual Property Law

(57) ABSTRACT

A vehicle washing system and a method for operating such a vehicle washing system in which a vehicle is scanned in a longitudinal direction by a sensor device. Measurement data are captured so that position data for the positions of vehicle wheels are determined based on an evaluation of the measurement data. The determined position data of the positions of the wheels are subjected to a confidence check, so that a confidence measure is determined. If the determined confidence measure is greater than or equal to a confidence threshold value, a treatment of the wheels is carried out in a first mode at the positions associated with the position data, and, if the determined confidence measure is smaller than the confidence threshold value, a treatment of the wheels is not carried out, or is carried out in a second mode at the positions associated with the position data.

14 Claims, 2 Drawing Sheets

(51) Int. Cl.
B08B 1/00 (2006.01)
B08B 3/02 (2006.01)

(56) References Cited

U.S. PATENT DOCUMENTS

| | | | | |
|---|---|---|---|---|
| 2007/0174981 | A1* | 8/2007 | Smith | B60S 3/06 15/53.2 |
| 2007/0175498 | A1* | 8/2007 | Smith | B60S 3/042 134/34 |
| 2017/0066293 | A1* | 3/2017 | Watanabe | B60C 23/0489 |
| 2020/0031320 | A1* | 1/2020 | Heid | B60S 3/042 |

FOREIGN PATENT DOCUMENTS

| | | |
|---|---|---|
| EP | 0947405 A2 | 10/1999 |
| EP | 1795409 A2 | 6/2007 |
| EP | 2571734 A1 | 3/2013 |
| WO | 2013/064574 A1 | 5/2013 |

OTHER PUBLICATIONS

Written Opinion for PCT/EP2017/079536 filed Nov. 17, 2017.
International Preliminary Report dated May 28, 2019 for PCT/EP2017/079536 filed Nov. 17, 2017 with Written Opinion.

\* cited by examiner

METHOD FOR OPERATING A VEHICLE WASHING SYSTEM, AND VEHICLE WASHING SYSTEM

FIELD OF THE INVENTION

The present invention relates to a vehicle washing system for the treatment of the wheels of the vehicle. According to this method, a vehicle is scanned in the longitudinal direction by means of a sensor device, with measurement data being captured and with position data for the positions of wheels of the vehicle being determined based on an analysis of the measurement data. The invention further relates to a vehicle washing system comprising a treatment unit for the wheels of a vehicle, a sensor device for scanning the vehicle in the longitudinal direction, with measurement data being captured during scanning, and a position determination device which is connected to the sensor device and by means of which, based on an analysis of the measurement data, position data for the positions of the wheels of the vehicle are determined.

BACKGROUND OF THE INVENTION

In a vehicle washing system in which the wheels of a vehicle are to be treated, more specifically, cleaned, it is necessary to determine the positions of the wheels in order to be able to control a treatment unit for cleaning the wheels.

DE 38 111 96 C2 describes a system for washing the wheels of vehicles in a conveyor tunnel car wash in which the position of a wheel of the vehicle is determined by means of a light barrier. The wheels of a vehicle moving in the conveyor tunnel car wash interrupt the light barrier. As soon as the forward rolling front wheels of the vehicle unblock the light beam of the light barrier, a servo controller actuates drive motors for a carriage on which the wash brushes for the wheels are disposed.

EP 0 947 405 B1 discloses a gantry vehicle washing system which comprises two independently moving gantries. The gantry vehicle washing system comprises a sensing device for detecting the vehicle wheels. In addition, at least one of the gantries comprises a wheel washing device. The sensing device involved is, for example, a light barrier with a transmitter and an oppositely disposed receiver.

EP 2 571 734 B1 discloses a system and a method for applying cleaning fluid to a wheel of a vehicle in a vehicle washing system, wherein a light barrier is provided for determining the beginning and end of a wheel.

In addition, DE 20 205 050 U1 discloses a system for detecting the position of a wheeled vehicle while said vehicle is entering a vehicle treatment system. In this system, at least one electrical switching device is disposed near ground level, which is actuated as at least one wheel of the vehicle is traversing it. By means of an analysis unit, the current position of the wheel and thus of the vehicle is determined based on the actuation of the switching device.

The problem encountered in conventional vehicle washing systems has been that especially in cases in which the vehicles have relatively low ground clearance or low-hanging vehicle parts, the determination of the position of the wheels of the vehicle is susceptible to error. An incorrect determination of the position of the wheels can impair the treatment or, more specifically, the cleaning of the vehicle. In addition, in such an event, the car's finish may become damaged.

SUMMARY OF THE INVENTION

Thus, one aspect of the present invention relates to a method and a vehicle washing system of the type mentioned above which, on the one hand, make it possible satisfactorily to carry out the desired treatment of the wheels of the vehicle, but which, on the other hand, also minimize the risk of damage to the vehicle.

Advantageous embodiments and refinements of the method and vehicle washing system according to the invention are also disclosed.

Thus, according to the method disclosed by the present invention, a vehicle is scanned in the longitudinal direction by means of a sensor device while capturing measurement data. Based on an analysis of the measurement data, position data for the positions of the wheels of the vehicle are determined. The determined position data of the positions of the wheels of the vehicle are subjected to a confidence check, wherein a confidence measure is determined. If the determined confidence measure is greater than or equal to a confidence threshold value, a treatment of the wheels of the vehicle is carried out in a first mode at the positions associated with the position data. If, on the other hand, the determined confidence measure is smaller than the confidence threshold value, a treatment of the wheels of the vehicle is not carried out or is carried out in a second mode at the positions associated with the position data.

The position data for the positions of the wheels of the vehicle can comprise, for example, the position of the center of a wheel in the longitudinal direction of the vehicle and the diameter of the wheel.

In the analysis of the measurement data of the sensor device, it is possible, because of the usual arrangement of vehicle wheels on a vehicle while taking into account certain assumptions and models, to determine the position of the wheels of the vehicle. However, during this determination, errors may result. Such errors may be caused, for example, by low-mounted vehicle parts or low-hanging vehicle parts. Therefore, according to the invention, the quality of the determination of the position data for the positions of the wheels of the vehicle is factored into the confidence check. A measure of the quality of the determination of the correct position data for the positions of the wheels is the confidence measure.

For a determined position of a wheel, the confidence measure indicates the probability that this determined position is the correct position of the wheel. In the determination of the confidence measure, more specifically, all of the measurement data that were generated by the sensor device are factored in. In the method according to the present invention, the confidence measure is used to decide whether the position has been correctly or incorrectly identified. Thus, the confidence measure is a classifier which assigns one of the classes, either correct or incorrect, to a determined position. The classification is made based on the confidence threshold value. In this manner, a confidence interval is formed. If the determined confidence measure is outside of the confidence interval, i.e., below the confidence threshold value, the method according to the invention assumes that the position of the wheel has not been correctly identified. In this case, the treatment of the wheels of the vehicle is not carried out or is carried out in a second mode. In this second mode, more specifically, it is possible reliably to prevent damage to the vehicle, even if the position of a wheel of the vehicle has been incorrectly identified and if, based on these incorrect position data for the position of the wheel, a treatment is carried out.

The method according to the present invention thus ensures that the wheels of the vehicle will be treated as desired if the positions of the wheels of the vehicle have been correctly determined with a high level of probability.

At the same time, however, it is ensured that the vehicle will not be damaged if, with a high level of probability, the position of a wheel of the vehicle has been incorrectly determined.

According to one development of the method disclosed by the invention, the vehicle is scanned along a sufficient length in the longitudinal extension by means of the sensor device before a treatment of the wheels of the vehicle is started. For example, the vehicle can be scanned over a longitudinal extension of at least 1,700 mm, especially of at least 2300 mm, before a treatment of the wheels of the vehicle is started.

According to another development of the method disclosed by the invention, the vehicle is scanned substantially in its entire longitudinal extension, especially in its entire longitudinal extension, by means of the sensor device before a treatment of the wheels of the vehicle is started. In this context, 'substantially' means that scanning in the longitudinal extension of the vehicle can also be carried out over a somewhat shorter range than the entire longitudinal extension of the vehicle. For example, scanning can be carried out over a maximum length approved for the vehicle washing system minus a wheel radius in the front and a wheel radius in the rear. This takes into account that the front end and the rear end of the vehicle always jut slightly out over the wheel.

Scanning by the sensor device is preferably carried out optically. For example, to scan the vehicle, a gantry of the vehicle washing system can be moved in the longitudinal direction of the vehicle. Alternatively, in a conveyor tunnel car wash, the vehicle moves in the longitudinal direction past the sensor device. By completely scanning the vehicle in the longitudinal direction before the treatment of the wheels of the vehicle is started, it is possible to capture measurement data, by means of which the confidence measure of the position data of the positions of the wheels of the vehicle can be determined with greater accuracy. Thus, the quality of the determination of the positions can be improved. In this manner, it can be more accurately determined whether a position of a wheel has been correctly or incorrectly identified.

As a result of the confidence check, the determined confidence measure is, specifically, smaller if during the analysis of the measurement data, it was determined that the vehicle has more than two axles. Alternatively or additionally, the determined confidence measure is, specifically, smaller if during the analysis of the measurement data it was determined that the vehicle has more than two wheels on one side of the vehicle. The wheels or axles can be detected, for example, in that the signal of the sensor device changes in a certain region. For example, in this region, a light barrier may be interrupted and at best generate a signal only in a very short section within this region. The determined confidence measure is, specifically, smaller than the confidence threshold value if it was determined that the vehicle has more than two axles or more than two wheels on one side of the vehicle.

By scanning the vehicle in the longitudinal direction, the number of axles and/or wheels can be especially reliably and easily determined. If, in a vehicle washing system which has been approved for vehicles with two axles, it was determined that the vehicle has more than two axles or more than two wheels on one side of the vehicle, the analysis of the measurement data will be incorrect with a high level of probability. In the method according to the present invention, the determined confidence measure will in such a case be reduced. Unless in this case other measurement data verify the determined position data for the wheels of the vehicle with a high level of probability, the confidence measure in this case falls below the confidence threshold value, so that an incorrect determination of the position of the wheels is assumed.

According to another development of the method disclosed by the invention, the determined confidence measure is greater than or equal to the confidence threshold value if, based on the analysis of the measurement data, position data for the positions of two wheels were determined, according to which the centers of the wheels are at a distance of more than 1,700 mm from each other and the determined horizontal chord of each wheel at a height of 80 mm is within a range from 400 mm to 600 mm. In this case, the vehicle is, specifically, optically scanned in the longitudinal direction by means of a light barrier, for example. In this manner, it is possible to capture the length of the chord of a wheel. In this case, the length of the chord s is calculated as follows:

$$s = \sqrt{8rh - 4h^2}$$

where r stands for the radius of the wheel and h stands for the height of the light barrier. Thus, at a height of 80 mm, the length of the chord is 480 mm at a radius of the wheel of 40 cm and the length of the chord is 408 mm at a radius of the wheel of 30 cm, so that the above-stated range of the length of the chord can be assigned to a wheel with a high level of probability. If the measurement by means of the light barriers is carried out at a different height, the length of the chord, and thus the range for the length of the chord, must be adjusted accordingly.

Alternatively, it is also possible to consider the free distance between two wheels. If this free distance is greater than 1400 mm and the determined horizontal chord of each wheel at a height of 80 mm is within a range from 400 mm to 600 mm, the determined confidence measure is greater than or equal to the confidence threshold value.

In the cases mentioned above, even vehicles with a very short wheel base of approximately 1900 mm are still correctly captured.

According to another development of the method disclosed by the present invention, for a reference vehicle, target ranges for geometric parameters for positions of a front reference wheel and a rear reference wheel relative to the body shell of the reference vehicle are defined. Based on an analysis of the measurement data, these geometric parameters are established for the vehicle, and it is determined whether the established geometric parameters are within the defined target ranges. If the established geometric parameters are outside of the defined target ranges, the confidence measure in the method according to the present invention is smaller.

For example, for a reference vehicle, a first ratio of the distance of the front end from the position of a front reference wheel to the distance of the front end from the rear end can be defined. Alternatively or additionally, a second ratio of the distance of the rear end from the position of the rear reference wheel to the distance of the front end from the rear end can be defined. Alternatively or additionally, a third ratio of the distance of the front end from the position of the front reference wheel to the distance of the position of the front reference wheel from the position of the rear reference wheel can be defined. Alternatively or additionally, a fifth ratio of the distance of the position of the front reference wheel from the position of the rear reference wheel to the distance of the front end from the rear end can be defined. For one or more of these ratios, a target range is defined, or several target ranges are defined. For the vehicle that has been scanned in the longitudinal direction by means of the sensor device, one of these ratios is determined or several of these ratios are determined, and a check is performed to establish whether the determined ratios are within the respective target range or within the respective target ranges. If this is not the case, the confidence measure in the method according to the present invention is reduced.

In the method according to the present invention, during the treatment of the wheels in the first mode, more specifically, the wheels are mechanically cleaned by means of brushes. Prior to this mechanical treatment, the wheels can be sprayed with a cleaning fluid. This type of wheel cleaning is known in the art.

According to another development of the method disclosed by the invention, the treatment of the wheels in the second mode involves touchless cleaning of the wheels. Touchless cleaning is defined to mean that no solid washing elements, such as brushes or cloths, come into contact with the wheels. Fluids, on the other hand, may come into contact with the wheels. For example, during touchless cleaning, a high-pressure jet of washing liquid is directed at the wheels. During the treatment of the wheels in the second mode, it was established in advance that the confidence measure for the determination of the position of the wheels is small. Thus, in this case, the level of probability that the positions were incorrectly determined is high. Touchless cleaning does not entail the risk that other parts of the vehicle will be damaged or that the cleaning result of the rest of the vehicle parts, particularly the parts of the body shell, will be unsatisfactory because cleaning fluid intended for the wheels had been applied at the wrong positions.

The vehicle washing system can be a gantry-type vehicle washing system or a conveyor tunnel car wash. In the former case, for example, to clean the vehicle, a gantry, in a first forward pass, can scan the standing vehicle in the longitudinal direction by means of the sensor device, and a cleaning foam can be applied to a body shell of the vehicle; in a first return pass in the first mode, a cleaning fluid can be applied at the determined positions at the wheels; and in a second forward pass, high-pressure cleaning of the body shell and mechanical cleaning of the wheels can be carried out. Alternatively, to clean the vehicle, the gantry, in the first forward pass, can only scan the standing vehicle in the longitudinal direction by means of the sensor device, without applying the cleaning foam to a body shell of the vehicle. In the latter case, for example, in the conveyor tunnel car wash, the vehicle can first be moved completely past the sensor device before the treatment of the wheels is started.

According to a refinement of the method disclosed by the present invention, a display unit is used to show whether the treatment of the wheels is carried out in the first or in the second mode. More specifically, the display unit shows if the treatment of the wheels of the vehicle has been deactivated for safety reasons or if, for safety reasons, the wheels are being washed without mechanically operating brushes.

The vehicle washing system disclosed by the present invention comprises a treatment unit for wheels of a vehicle, a sensor device for scanning the vehicle in the longitudinal direction while capturing measurement data during scanning, and a position determination device which is connected to the sensor device and by means of which, based on an analysis of the measurement data, position data for the positions of the wheels of the vehicle are determined. The vehicle washing system disclosed by the present invention is characterized by a checking device which is connected to the position determination device and by means of which a confidence check for the determined position data of the positions of the wheels of the vehicle is carried out and a confidence measure is determined. The vehicle washing system disclosed by the present invention is further characterized by a control unit which is connected to the treatment unit and which actuates the treatment unit in such a way that a treatment of the wheels of the vehicle is carried out in the first mode at the positions associated with the position data if the determined confidence measure is greater than or equal to a confidence threshold value, and that a treatment of the wheels of the vehicle is not carried out or is carried out in a second mode at the positions associated with the position data if the determined confidence measure is smaller than the confidence threshold value.

The vehicle washing system disclosed by the present invention is particularly suitable for carrying out the method described above. The system therefore also has the same advantages as this method.

The vehicle washing system preferably comprises at least one light barrier which serves as the sensor device. Alternatively or additionally, the sensor device can comprise a camera, an ultrasound sensor, an inductive and/or capacitive sensor and/or a mechanical sensor.

The vehicle washing system can be, e.g., a gantry-type vehicle washing system with one gantry or with two gantries (double gantry system) or a conveyor tunnel car wash.

BRIEF DESCRIPTION OF THE DRAWINGS

The invention will be explained based on an embodiment example with reference to the attached drawings.

DETAILED DESCRIPTION OF THE INVENTION

Figure 1:
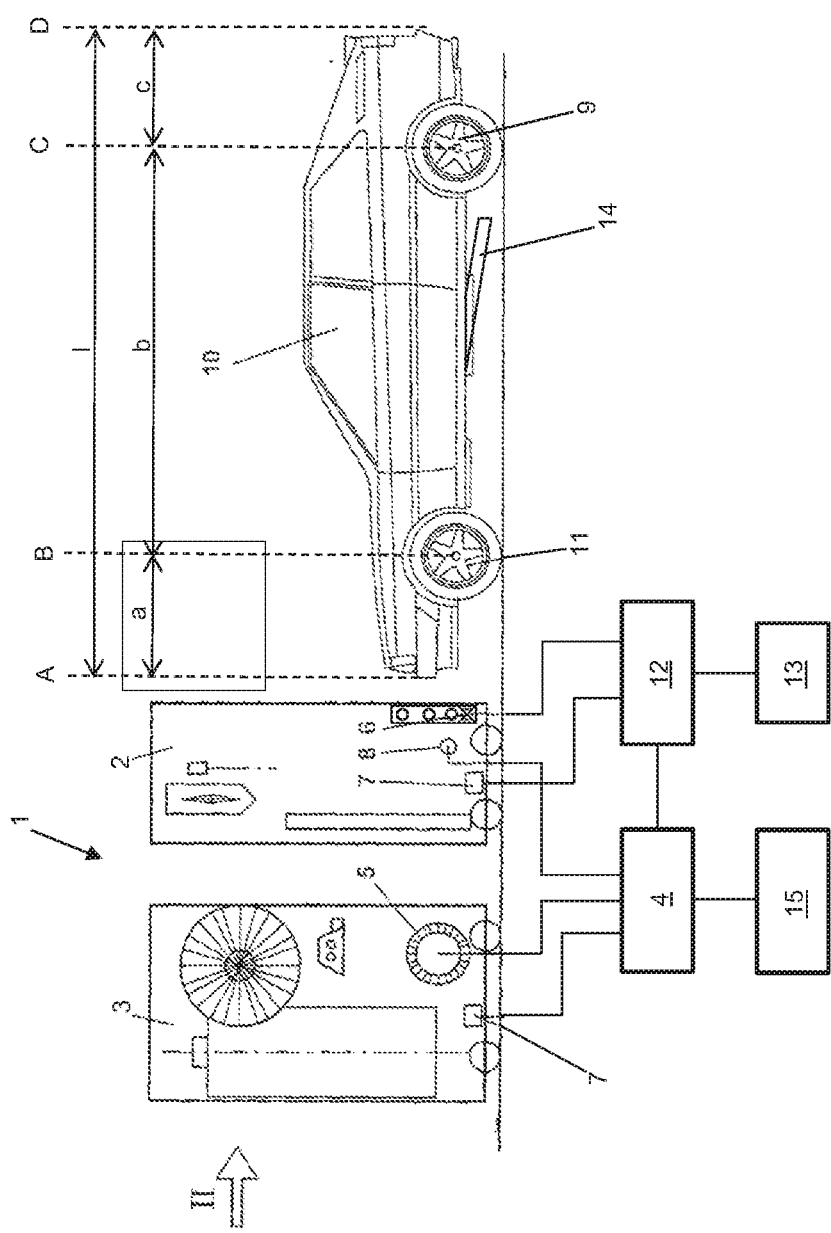
FIG. 1 diagrammatically shows a lateral view of the configuration of an embodiment example of the vehicle washing system according to the present invention and FIG. 2 shows a front view of the configuration of the embodiment example seen in FIG. 1.
Figure 2:
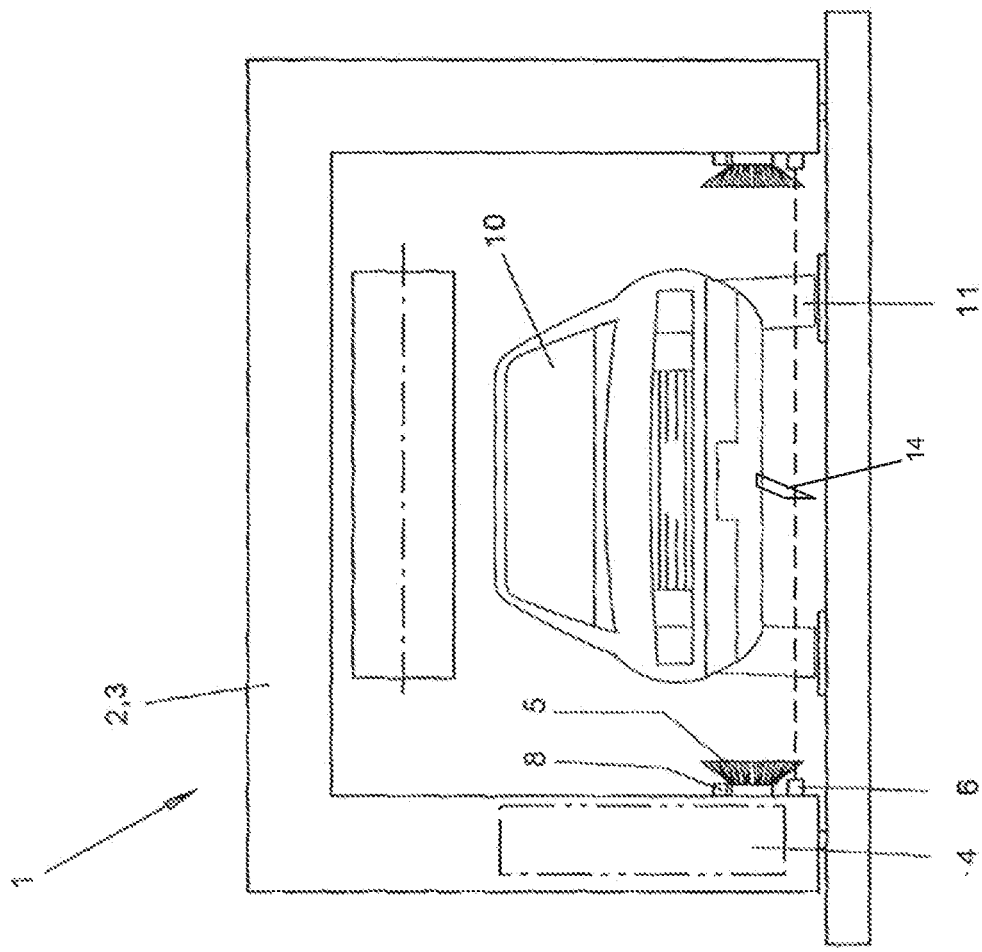

With reference to FIGS. 1 and 2, first an embodiment example of the vehicle washing system 1 according to the present invention will be described:

The vehicle washing system 1 is a gantry-type vehicle washing system, in which the gantries 2, 3 are moved in the longitudinal direction of the vehicle 10 relative to a stationary vehicle 10. However, the invention may be used in the same way in a vehicle washing system in the form of a conveyor tunnel car wash in which the vehicle moves in the longitudinal direction relative to stationary treatment units. Furthermore, the vehicle washing system 1 shown in the embodiment example is a double gantry system with two independently moving gantries 2 and 3. However, the invention could also be implemented in a gantry-type vehicle washing system with only one gantry.

The front gantry 2 comprises a sensor device 6, a path capture device 7, and wheel treatment device 8.

In the embodiment example described, the sensor device 6 comprises a plurality of light barriers which are disposed at different heights. However, it would also be possible to dispose only one light barrier at a height above the guide for the wheels 9, 11 of the vehicle 10 but below the body shell of the vehicle. The light barrier can be disposed, for example, at a height of 80 mm. Each light barrier comprises a light emitter on one side of the gantry and a light detector directly across from it on the opposite side of the gantry. Thus, the operation of the sensor device 6 is touchless. Alternatively, the sensor device might also be configured in the form of a reflection light barrier or as an ultrasound sensor, an inductive sensor or a capacitive sensor and as a mechanical, rotatably mounted switch flag.

The path capture device 7 captures the position of the front gantry 2 relative to the stationary ground and thus relative to the vehicle 10. The path capture device 7 can, for example, be a rotary encoder on the wheels of the gantry.

In the embodiment example described, the wheel treatment device 8 is a spray head and/or a foam dispensing head which can apply washing fluid or foam to the wheels 9, 11 of the vehicle, specifically, to the rims of the wheels. Wheel treatment devices 8 of this type are known in the art.

The rear gantry 3 also comprises a path capture device 7 which, in the same manner as the path capture device 7 of the front gantry 2, captures the position of the rear gantry 3 relative to the stationary ground and thus relative to the vehicle 10. The rear gantry 3 also comprises a wheel washing device 5. The wheel washing device 5 comprises rotating wheel washing brushes, by means of which, specifically, the rims of the wheels 9 and 11 of the vehicle can be mechanically cleaned. The wheel treatment device 8 and the wheel washing device 5 together form a treatment unit for the wheels 11, 9 of the vehicle 10.

The sensor device 6 and the path capture device 7 are connected via data links to a position determination device 12. The position determination device 12 captures the measurement data of the path capture device 7, and, on that basis, continuously calculates the respective current position of the front gantry 2. In addition, measurement data of the sensor device 6, i.e., the measurement data of the various light barriers of the sensor device 6, are transmitted to the position determination device 12. These measurement data especially indicate whether a light barrier of the sensor device 6 had been interrupted at a specific position of the front gantry 2 relative to the vehicle 10. In the vertical direction, the light barriers of the sensor device 6 are disposed in such a manner that the lowermost light barrier is located below the lowermost plane of the body shell of a conventional vehicle, e.g., at a height of 80 mm, which includes vehicles with relatively low ground clearance. In the vertical direction, the uppermost light barrier of the sensor device 6 is disposed in such a manner that it is located above the lower edge of the body shell, even if the vehicle involved is a vehicle with very high ground clearance, for example, an off-road vehicle. As will be explained below with regard to the method according to the present invention, the position determination device 12 is able to analyze the measurement data of the sensor device 6 in such a way that, in the in longitudinal direction, the position of the front end A, the position B of the front wheel 11, the position C of the rear wheel 9, and the position D of the rear end of the vehicle 10 can be determined.

The position determination device 12 is connected to a checking device 13, by means of which a confidence check for the determined position data of the positions of the wheels 9 and 11 of the vehicle 10 can be carried out, and a confidence measure can be determined, as will be explained below with regard to the method according to the present invention.

The checking device 13 further comprises a storage unit in which target ranges for geometric parameters of a reference vehicle are stored. These geometric parameters define positions of a front reference wheel and a rear reference wheel relative to the body shell of the reference vehicle. The data stored for a reference vehicle are, specifically, a first ratio of the distance of the front end of the reference vehicle from the position of a front reference wheel to the distance of the front end of the reference vehicle from the rear end of the reference vehicle, a second ratio of the distance of the rear end of the reference vehicle from the position of a rear reference wheel to the distance of the front end of the reference vehicle from the rear end of the reference vehicle, a third ratio of the distance of the front end of the reference vehicle from the position of the front reference wheel to the distance of the front position of the front reference wheel from the position of the rear reference wheel, a fourth ratio of the distance of the rear end of the reference vehicle from the position of the rear reference wheel to the distance of the position of the front reference wheel from the position of the rear reference wheel, and/or a fifth ratio of the distance of the position of the front reference wheel from the position of the rear reference wheel to the distance of the front end of the reference vehicle from the rear end of the reference vehicle. For one or more of these ratios, target ranges are stored in the storage unit of the checking device 13.

The position determination device 12 is connected to a control unit 4, with the position determination device transmitting the determined position data for the front wheel 11 and the rear wheel 9 of the vehicle 10, together with a confidence measure for the reliability of the determined position data, to the control unit 4.

The control unit 4 is connected to the wheel treatment device 8 of the front gantry 2 and the wheel washing device 5 of the rear gantry 3. The control unit 4 is able to control the operation of the wheel treatment device 8 in such a way that washing fluid or foam can be dispensed at specific positions in the longitudinal direction of the vehicle 10. The control unit 6 similarly controls the wheel washing device 5 in such a way that at specific positions in the longitudinal direction of the vehicle 10, brushes of the wheel washing device 5 are moved in the transverse direction of the rear gantry 3 toward a wheel 9 or 11 and that the brushes are set in rotation so that a wheel 9 or 11 is mechanically cleaned.

In addition, the control unit 4 also controls the movement of the gantries 2 and 3 in the longitudinal direction of the vehicle 10. To this end, the control unit 4 is connected to drive motors for the wheels of the gantries 2 and 3. Furthermore, the data captured by the path capture devices 7 of the gantries 2 and 3 are directly or indirectly transmitted to the control unit 4 via the position determination device 12.

Lastly, the control unit 4 is also connected to a display unit 15 which displays information on the operation of the vehicle washing system 1 to the user.

Below, an embodiment example of the method according to the present invention and further details of the embodiment example of the vehicle washing system 1 disclosed by the present invention will be explained:

First, a vehicle 10 is driven into the vehicle washing system 1 where it comes to a stop, as shown in FIG. 1. Subsequently, the operation of the vehicle washing system 1 is centrally controlled by means of the control unit 4. First, the front gantry 2 is moved in the longitudinal direction of the vehicle 10, i.e., in the direction of arrow II. During this time, the sensor device 6 is switched on, i.e., the light barriers of the sensor device emit light beams, and captures information that indicates which light beam is interrupted at which position relative to the position of the vehicle 10. The position determination device 12 captures the latest position of the front gantry 2 relative to the vehicle 10 by means of the path capture device 7 of the front gantry 2 together with the signals of the sensor device 6. The vehicle 10 is scanned along its entire longitudinal extension by means of the sensor device 6 before a treatment of the wheels 9, 11 of the vehicle 10 is started.

The measurement data are subsequently analyzed by means of the position determination device 12. As a result of this analysis, the position data for the positions of the wheels 9 and 11 of the vehicle 10 are determined. For example, the measurement data can be analyzed by looking at the signal of the lowermost light barrier or the two lowermost light barriers of the sensor device 6 which is/are positioned below the lower horizontal plane of the body shell of the vehicle 10. As the front gantry 2 moves along the longitudinal direction of the vehicle 10, these light barriers are interrupted by the wheels 11 and 9. Based on the positions at which the light barrier is interrupted and subsequently again unblocked, the width and the center of a wheel can be determined. This determination can factor in the possibility that the light barrier now and then is unblocked for a brief period of time since, especially if the rims are relatively open, the light beams of the light barriers can pass through the gaps of the rims.

FIGS. 1 and 2 also show a situation in which a disruptive element 14 hangs down from the body shell of the vehicle. This element, for example, can be a low-hanging exhaust pipe. In conventional methods used to operate a vehicle washing system 1 in which the positions of the wheels 9 and 11 of the vehicle 10 are captured, such disruptive elements 14 lead to a malfunction, since the disruptive element 14, such as a wheel, can interrupt a light barrier of the sensor device 6 along a similar section.

In the case illustrated in FIGS. 1 and 2, however, the vehicle 10 is first scanned along its entire longitudinal extension so that the interruptions of the light barriers of the sensor devices 6 which are caused by the disruptive element 14 are captured by the position determination device 12; however, additionally, the rear wheel 9 of the vehicle 10 is captured by further interruptions of the light barriers of the sensor devices 6 as well. The measurement data of the sensor device 6 are analyzed only after the vehicle has been scanned along its entire longitudinal extension.

The measurement data are subsequently transmitted by the position determination device 12 to the checking device 13. The checking device 13 subjects the position data for the positions of the wheels 11 and 9 of the vehicle 10, which were determined by the position determination device 12, to a confidence check. During this confidence check, a confidence measure is determined, which provides information about the reliability of the determined position data.

Based on the measurement data and the determined position data for the wheels 9 and 10, the checking device 13 determines, inter alia, to what extent the diameters of the wheels 9 and 11 agree. If there is a very high level of agreement between the diameters or widths of the wheels 9 and 11 at a specific height, the checking device 13 assigns a high confidence measure to the determined position data, which is above a confidence threshold value. Unless the confidence measure is reduced by additional analyses, it follows from such a high confidence measure that the reliability of the determined position data for the wheels 9 and 11 is very high, so that at these position data, the cleaning of the wheels 9 and 11 can be carried out further down the line in the vehicle washing system 1.

However, if the position determination device 12, due to the interruption of the light barriers of the sensor device 6 caused by the disruptive element 14, determined that the vehicle 10 has three axles and three wheels on the same side, the checking device 13 reduces the confidence measure to such a level that it falls below the confidence threshold value. This has the consequence that further down the line in the vehicle washing system 1, it is assumed that the positions of the wheels 9 and 11 have been determined incorrectly.

Based on the measurement data of the sensor device 6, the checking device 13 further establishes geometric parameters for the vehicle 10, which parameters can be compared with the geometric parameters for the reference vehicle which are stored in the checking device 13. More specifically, it is possible to determine whether the established geometric parameters are within the defined target ranges stored for the reference vehicle. If the established geometric parameters are outside of a few or more defined target ranges, this may possibly lead to differently weighted reductions of the confidence measure.

For example, by means of the additional upper light barriers of the sensor device 6, position data are established for the position A of the front end of the vehicle and for the position D of the rear end of the vehicle 10. Based on the position data for the positions B of the axle of the front wheel 11 and the position C of the axle of the rear wheel 9, the distance a of the position A of the front end of the vehicle from the position B of the axle of the front wheel 11 is determined. In addition, the distance c of the position C of the axle of the rear wheel 9 from the position D of the rear end of the vehicle 10 is determined. Lastly, the distance b of the position B of the axle of the front wheel 11 from the position C of the axle of the rear wheel 9 is determined. Finally, the length l of the vehicle 10 is determined, i.e., the distance of the position A of the front end of the vehicle 10 from the position D of the rear end of the vehicle. Based on these distances, certain ratios are established, which indicate whether the positions B and C are in fact associated with a high level of probability with the wheels 9 and 11 of the vehicle 10.

Using the method according to the present invention, one or more of the following ratios is/are determined: a/l; c/l; a/b; c/b; b/l. For these ratios, relevant target ranges for the associated ratios of a reference vehicle are stored in the checking device 13. The checking device 13 determines which ratios are within the target range. If one or several ratios are outside of the target range, the confidence measure is reduced.

After completion of the analysis, the determined position data for the positions B and C of the wheels 9 and 11 of the vehicle 10, together with the determined confidence measure, are transmitted to the control unit 4. Prior to the further treatment of the wheels 9, 11 of the vehicle 10, the control unit 4 establishes whether the confidence measure is greater than or equal to a previously defined confidence threshold value or whether the determined confidence measure is smaller than this confidence threshold value.

If the determined confidence measure is greater than or equal to the confidence threshold value, the wheels 9 and 11 will be cleaned in a first mode at the positions B, C associated with the position data. In this first mode, the wheels 9, 11 of the vehicle 10 will be cleaned by a method known in the art.

To this end, for example, the front gantry 2 is moved back in the longitudinal direction of the vehicle 10. At the same time, the wheel treatment device 8 applies washing fluid and/or foam to the wheels 9 and 11. Where appropriate, the front gantry 2 can return once to the front side of the vehicle 10 and can subsequently be moved back to the rear side of the vehicle 10. Subsequently, the rear gantry 3, under the control of the control unit 4, is moved in the longitudinal direction of the vehicle 10, and, taking into the account the determined position data for the positions B, C for the positions of the wheels 11 and 9, the wheels 11 and 9 are mechanically cleaned by means of the wheel washing device 5. Wheel cleaning can be carried out in different ways and is known in the art.

If, on the other hand, the determined confidence measure is smaller than the confidence threshold value, a first embodiment of the method provides that a treatment of the wheels 9 and 11 of the vehicle 10 be dispensed with. More specifically, the wheels 9 and 11 are not cleaned. The rest of the body shell of the vehicle 10 can be cleaned by a method known in the art. At the same time, a notice on the display unit 15 will indicate that the wheel wash was deactivated for safety reasons.

In another embodiment of the method, if the determined confidence measure is smaller than the confidence threshold value, the treatment of the wheels 9, 11 of the vehicle 10 is carried out in a second mode at the positions B, C associated with the position data. In this second mode, the wheels 9, 11 are not mechanically cleaned, but subjected to touchless cleaning, for example, by means of a high-pressure jet of washing fluid which can be directed by the wheel treatment device 8 or by the wheel washing device 5 at the wheels 11, 9. In this case, even if the position of a wheel has been incorrectly determined, the risk of damage to the vehicle 10 in the second mode will be minimized or ruled out. Similarly, during the treatment of the wheels 9, 11 in the second mode, a relevant notice on the display unit 15 will indicate that, for safety reasons, the wheel cleaning is carried out without brushes.

In yet another embodiment example of the method according to the present invention and of the vehicle washing system 1 disclosed by the invention, no geometric parameters of a reference vehicle are stored in the storage unit of the checking device 11, but instead a minimum value for the distance between the centers of the wheels 9, 11 and a range for a captured chord of the circle of a wheel 9, 11 of the vehicle at the height of the lower light barrier of the sensor device 6. For example, a value of 1,700 mm can be stored as the minimum distance between the centers of the wheels 9, 11. If the lowermost light barrier of the sensor device 6 is mounted at a height of 80 mm, a range from 400 mm to 600 mm is stored for the range of a horizontal chord of a wheel 9, 11 of the vehicle 10.

Alternatively, it is also possible to store a minimum value for the free distance between two wheels 9, 11 and a range for a captured chord of the circle of a wheel 9, 11 of the vehicle, each at the height of the lower light barrier of the sensor device 6. In one embodiment example, a value of 1400 mm is stored as the minimum value of the free distance, and a range from 400 mm to 600 mm is stored as the range for the determined horizontal chord of each wheel at a height of 80 mm.

As the method is being carried out, the sensor device 6 captures the lengths of the chords of a circle of the wheels 11 and 9 of the vehicle by capturing the signals of the lowermost light barrier of the sensor device 6 as a function of the position of the sensor device 6 relative to the vehicle 10. First, a signal is captured by means of the lowermost light barrier, since the light barrier is not interrupted. In the vicinity of the front wheel 11, the light barrier is interrupted, and subsequently signals are possibly detected again in small sections if the light barrier can pass through openings in the rim. After the front wheel 11 has passed the light barrier of the sensor device 6, a signal of the light barrier is again captured over a relatively long section. In this way, the length of the chord of the front wheel 11 can be determined. The chord of the rear wheel 9 is captured in the same way.

If no more interruptions of the light barrier outside of the ranges determined in this manner for the wheels 11 and 9 result, and if the distance between the centers of the determined chords, i.e., including the respective center of the wheels 11 and 9, is greater than 1,700 mm and the lengths of the chords are within a range from 400 mm to 600 mm, the confidence measure is above the confidence threshold value. The reason is that in this case, it can be assumed with a high level of confidence that the positions of the wheels 11 and 9 have been correctly determined.

In this case, the vehicle 10 is scanned along a longitudinal extension of at least 2300 mm, especially, however, along its entire longitudinal extension, before a treatment of the wheels of the vehicle is started.

However, if, e.g., because of the disruptive element 14, sections are determined in which the lowermost light barrier of the sensor device 6 is interrupted without, however, meeting the above-mentioned conditions, the confidence measure is below the confidence threshold value. In this case, it can be assumed with a high level of probability that the positions of the wheels have been incorrectly determined.

The method is subsequently further carried out depending on whether the confidence measure is greater than or equal to the previously defined confidence threshold value or whether the determined confidence measure is smaller than this confidence threshold value, as was described above.

In yet another embodiment example of the vehicle washing system 1 and of the method according to the present invention, instead of a double gantry system, a gantry-type vehicle washing system with only one gantry is used. In this case, the gantry comprises the sensor device 6, the path capture device 7, the wheel treatment device 8, and the wheel washing device 5. In this case, the method is carried out as follows:

In a first forward pass, the gantry of the vehicle washing system 1 is moved in the longitudinal direction of the vehicle 10 past the vehicle, and, more specifically, along the entire longitudinal extension of the vehicle 10. During this time, as described above, the vehicle 10 is scanned by means of the sensor device 6 so as to capture measurement data, on which basis it is possible to determine position data of the positions B, C of the wheels 11, 9 of the vehicle 10. At the same time, during this first forward pass, a cleaning foam is applied to the body shell of the vehicle 10 using a method known in the art. After the first forward pass, the measurement data of the sensor device 6 are analyzed by means of the position determination device 12. As a result of this analysis, position data for the positions of the wheels 9, 11 of the vehicle 10, i.e., the position of the centers of the wheels 9, 11 in the longitudinal direction of the vehicle 10 and the respective diameter of the wheels 9, 11, are obtained. Subsequently, as described above, the confidence measure is determined by the checking device 13. The control unit 4 subsequently determines whether the confidence measure is greater than or equal to a previously defined confidence threshold value, or whether the determined confidence measure is smaller than this confidence threshold value.

In a first return pass of the gantry, the wheel treatment device 8 subsequently applies a washing fluid and/or foam to the wheels 9 and 11. Optionally, the washing fluid and/or the foam can also be mechanically rubbed on by means of the wheel washing device 5. The washing fluid and/or the foam are, however, applied and rubbed on by means of the wheel washing device 5 only in the first mode, i.e., if the confidence measure is greater than or equal to the previously defined confidence threshold value.

In a second forward pass, the body shell of the vehicle 10 is subsequently cleaned by means of high-pressure cleaning known in the art, and the wheels 11 and 9 of the vehicle 10 are mechanically cleaned by means of the wheel washing device 5 at the determined position data for the positions B, C for the positions of the wheels 11 and 9. Again, this cleaning cycle by means of the wheel washing device 5 is carried out only in the first mode.

As a first alternative, the high-pressure cleaning of the body shell of the vehicle 10 as known in the art is carried out directly in the second mode during the first return pass, and a second forward pass is no longer required. As a second alternative, touchless cleaning is carried out in the second mode during the first return pass at the determined position data for the positions B, C for the positions of the wheels 11 and 9. At the same time, the body shell of the vehicle 10 is subjected to high-pressure cleaning as known in the art, so that in this case again no second forward pass is required.

According to yet another embodiment example, in the vehicle washing system 1 with only one gantry, the vehicle 10 is initially again completely scanned by means of the sensor device 6 without application of a cleaning fluid or the like. Subsequently, the vehicle is cleaned and the wheels are washed in the first or in the second mode as described above.

Yet another embodiment example relates to a vehicle washing system 1, which is configured in the form of a conveyor tunnel car wash. In this case, the sensor device 6 is disposed at the start of the conveyor tunnel car wash. In this case, the vehicle 10 is moved past the sensor device 6, so that the position A of the front end of the vehicle, the positions B and C for the wheels 11 and 9 of the vehicle 10 and the position D of the rear end of the vehicle 10 can be determined, such as has been described above with respect to another movement of the sensor device 6 relative to the vehicle 10. In the conveyor tunnel car wash, the wheel treatment device 8 and the wheel washing device 5 in the longitudinal direction are, however, located at a distance from the sensor device 6, which measures at least the maximum approved length of a vehicle 10 for the conveyor tunnel car wash. This ensures that the vehicle 10 is first scanned by means of the sensor device 6 along its entire longitudinal extension before a treatment of the wheels 11, 9 of the vehicle 10 is started.

LIST OF REFERENCE CHARACTERS

1 Vehicle washing system
2 Front gantry
3 Rear gantry
4 Control unit
5 Wheel washing device
6 Sensor device
7 Path capture device
8 Wheel treatment device
9 Rear wheel
10 Vehicle
11 Front wheel
12 Position determination device
13 Checking device
14 Disruptive element
15 Display unit

The invention claimed is:

1. A method for operating a vehicle washing system, the method comprising:
    scanning a vehicle in a longitudinal direction by a sensor device, wherein measurement data are captured,
    analyzing the measurement data to determine position data for positions of wheels of the vehicle,
    conducting a confidence check of the determined position data to determine a confidence measure,
    comparing the determined confidence measure with a confidence threshold value,
    if the determined confidence measure is greater than or equal to the confidence threshold value, a treatment of the wheels of the vehicle is carried out in a first mode at the determined position data of the positions of the wheels of the vehicle, and
    if the determined confidence measure is smaller than the confidence threshold value, a treatment of the wheels of the vehicle is not carried out or is carried out in a second mode at the determined position data of the positions of the wheels of the vehicle.

2. The method of claim 1, wherein the vehicle is scanned by the sensor device along a longitudinal extension of at least 1,700 mm before the treatment of the wheels of the vehicle is started.

3. The method of claim 1, wherein the vehicle is scanned by the sensor device substantially along the vehicle's entire longitudinal extension before the treatment of the wheels of the vehicle is started.

4. The method of claim 1, wherein the determined confidence measure is greater than or equal to the confidence threshold value if, based on the analysis of the measurement data, position data for the positions of two wheels were determined, according to which the centers of the wheels are at a distance of more than 1,700 mm from each other and a determined chord of each wheel at a height of 80 mm is within a range from 400 mm to 600 mm.

5. The method of claim 1,
    wherein conducting the confidence check includes retrieving target ranges for geometric parameters of a reference vehicle from a database, the geometric parameters including positions of a front reference wheel and a rear reference wheel relative to a body shell of the reference, and
    determining whether the determined position data are within the target ranges, and
    wherein the confidence measure is smaller if the the determined position data are outside of the target ranges than if the determined position data are within the target ranges.

6. The method of claim 1, wherein to clean the vehicle, a gantry scans the vehicle in a first forward pass in the longitudinal direction by the sensor device, and a cleaning foam is applied to a body shell of the vehicle, a cleaning fluid is applied to the wheels in a first return pass in the first mode at the determined positions and in a second forward pass, and high-pressure cleaning of the body shell and mechanical cleaning of the wheels are carried out in a second forward pass.

7. The method of claim 1, wherein a notice on a display unit indicates whether the treatment of the wheels is carried out in the first or in the second mode.

8. A vehicle washing system, comprising
    a treatment unit for wheels of a vehicle,
    a sensor device for scanning the vehicle in the longitudinal direction, wherein measurement data is captured during scanning, and
    a position determination device, which is connected to the sensor device and analyzes the measurement data to determine position data for positions of the wheels of the vehicle, a checking device which is connected to the position determination device and performs a confidence check for the determined position data of the positions of the wheels of the vehicle to determine a confidence measure, and a control unit configured to compare the determined confidence measure with a confidence threshold value and is connected to the treatment unit and configured to control the treatment unit in such a way that a treatment of the wheels of the vehicle is carried out in a first mode at the determined position data of the positions of the wheels of the vehicle if the determined confidence measure is greater than or equal to the confidence threshold value, and a treatment of the wheels of the vehicle is not carried out or is carried out in a second mode at the determined position data of the positions of the wheels of the vehicle if the determined confidence measure is smaller than the confidence threshold value.

9. The method of claim 1, wherein the determined confidence measure is smaller if the analysis of the measurement data determines that the vehicle has more than two axles than if the analysis of the measurement data determines that the vehicle has two axles.

10. The method of claim 1, wherein the determined confidence measure is smaller if the analysis of the measurement data determines that the vehicle has more than two wheels on one side of the vehicle than if the analysis of the measurement data determines that the vehicle has two wheels on one side of the vehicle.

11. The method of claim 1, wherein the determined confidence measure is smaller if the analysis of the measurement data determines that the vehicle has more than two axles and more than two wheels on one side of the vehicle than if the analysis of the measurement data determines that the vehicle has two axles and two wheels on one side of the vehicle.

12. The method of claim 1, wherein during the treatment of the wheels in the first mode, the wheels are mechanically cleaned by brushes.

13. The method of claim 1, wherein during the treatment of the wheels in the second mode, the wheels are subjected to touchless cleaning.

14. The method of claim 1, wherein during the treatment of the wheels in the first mode, the wheels are mechanically cleaned by brushes and in the second mode, the wheels are subjected to touchless cleaning.

* * * * *